(12) United States Patent
Morikawa et al.

(10) Patent No.: US 10,075,036 B2
(45) Date of Patent: Sep. 11, 2018

(54) ROTOR FOR ROTARY ELECTRIC MACHINE HAVING RIDGE-SHAPED CONVEX PORTIONS AND CONCAVE PORTIONS TO SECURE A PRESS-FITTED SHAFT

(71) Applicant: Mitsubishi Electric Corporation, Chiyoda-ku, Tokyo (JP)

(72) Inventors: Akihiko Morikawa, Chiyoda-ku (JP); Kazuhisa Takashima, Chiyoda-ku (JP); Toshihiro Matsunaga, Chiyoda-ku (JP); Masayuki Miyaoka, Chiyoda-ku (JP); Akihiro Yamamura, Chiyoda-ku (JP); Hiroki Maeda, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 81 days.

(21) Appl. No.: 14/237,212

(22) PCT Filed: Sep. 20, 2012

(86) PCT No.: PCT/JP2012/074043
§ 371 (c)(1),
(2) Date: Feb. 5, 2014

(87) PCT Pub. No.: WO2013/073286
PCT Pub. Date: May 23, 2013

(65) Prior Publication Data
US 2014/0265699 A1 Sep. 18, 2014

(30) Foreign Application Priority Data
Nov. 18, 2011 (JP) .................. 2011-252218

(51) Int. Cl.
*H02K 1/28* (2006.01)
*H02K 1/27* (2006.01)

(52) U.S. Cl.
CPC ............ *H02K 1/28* (2013.01); *H02K 1/278* (2013.01)

(58) Field of Classification Search
CPC ................................ H02K 1/28; H02K 1/278
(Continued)

(56) References Cited

U.S. PATENT DOCUMENTS 4,215,287 A * 7/1980 Otto .................. F16C 27/08
310/216.123
4,326,333 A * 4/1982 Otto .................. F16C 27/08
29/525
(Continued)

FOREIGN PATENT DOCUMENTS

JP 59-145248 U 9/1984
JP 05-042332 A 2/1993
(Continued)

OTHER PUBLICATIONS

Japanese Office Action (Notification of Reason for Refusal), dated Jan. 28, 2014, Application No. 2011-252218.
(Continued)

*Primary Examiner* — Bernard Rojas
*Assistant Examiner* — Rashad Johnson
(74) *Attorney, Agent, or Firm* — Sughrue Mion, PLLC; Richard C. Turner

(57) ABSTRACT

The hole diameter of a shaft through hole formed in the rotor core is changed in the axial direction, thereby forming a concave portion whose hole diameter is large and a convex portion whose hole diameter is small in the inner circumferential surface of the shaft through hole; the convex portion is arranged at opening portions on both ends of the shaft through hole; a shaft having ridge-shaped convex portions on a press-fitting portion is press-fitted into the shaft through hole to assemble; the number of points of the
(Continued)

concave portion is equal to or more than two; and respective diameter dimensions of the concave portion, the convex portion, and the shaft are set to be the diameter of a main body of the shaft<the diameter of the convex portion<the diameter of ridge-shaped convex portions of the shaft<the diameter of the concave portion.

19 Claims, 2 Drawing Sheets

(58) Field of Classification Search
USPC .......... 310/156.08, 156.09, 156.21, 216.004, 310/216.049, 216.116, 216.121, 216.123
See application file for complete search history.

(56) References Cited

U.S. PATENT DOCUMENTS

| | | | | |
|---|---|---|---|---|
| 4,712,027 | A * | 12/1987 | Karidis | H02K 1/08 310/12.02 |
| 4,841,186 | A * | 6/1989 | Feigel | H02K 29/08 310/156.12 |
| 6,081,052 | A * | 6/2000 | Hosoe | B23K 1/19 310/12.23 |
| 6,492,755 | B1 * | 12/2002 | Jones | H02K 1/278 310/156.12 |
| 6,933,653 | B2 * | 8/2005 | Fauth | H02K 1/28 310/261.1 |
| 8,450,897 | B2 * | 5/2013 | Yoneyama | H02K 1/2733 310/156.12 |
| 8,823,239 | B2 * | 9/2014 | Ossenkopp | H02K 1/28 310/216.004 |
| 2004/0119345 | A1 * | 6/2004 | Takano | H02K 5/00 310/43 |
| 2005/0275305 | A1 * | 12/2005 | Nommensen | H02K 1/28 310/216.044 |
| 2006/0138894 | A1 | 6/2006 | Harada et al. | |
| 2007/0222326 | A1 * | 9/2007 | Ionel | H02K 1/22 310/216.067 |
| 2008/0079330 | A1 | 4/2008 | Ishida et al. | |
| 2010/0045132 | A1 * | 2/2010 | Zaps | H02K 1/278 310/156.21 |
| 2014/0062243 | A1 * | 3/2014 | Falk | H02K 1/276 310/156.08 |

FOREIGN PATENT DOCUMENTS

| | | | |
|---|---|---|---|
| JP | 08154351 | A * | 6/1996 |
| JP | 2000-295824 | A | 10/2000 |
| JP | 2001-186701 | A | 7/2001 |
| JP | 2004-336965 | A | 11/2004 |
| JP | 2006-187174 | A | 7/2006 |
| JP | 2006-217770 | A | 8/2006 |
| JP | 2008-199831 | A | 8/2008 |
| JP | 2011-019298 | A | 1/2011 |

OTHER PUBLICATIONS

Communication dated Mar. 24, 2016, from the European Patent Office in counterpart application No. 12849166.9.
Communication dated Mar. 3, 2016, from the State Intellectual Property Office of the People's Republic of China, in counterpart application No. 201280050628.1.
Communication dated Sep. 5, 2016, issued by the State Intellectual Property Office of the P.R.C. in corresponding Chinese Application No. 201280050628.1.

* cited by examiner

ROTOR FOR ROTARY ELECTRIC MACHINE HAVING RIDGE-SHAPED CONVEX PORTIONS AND CONCAVE PORTIONS TO SECURE A PRESS-FITTED SHAFT

CROSS REFERENCE TO RELATED APPLICATIONS

This application is a National Stage of International Application No. PCT/JP2012/074043 filed Sep. 20, 2012, claiming priority based on Japanese Patent Application No. 2011-252218 filed Nov. 18, 2011, the contents of all of which are incorporated herein by reference in their entirety.

TECHNICAL FIELD

The present invention relates to a rotor for a rotary electric machine and a motor for electric power steering.

BACKGROUND ART

Generally, a rotor of a rotary electric machine is configured such that a rotor core is fastened to a shaft by press-fitting the shaft into a through hole of a central portion of the rotor core in which steel sheets are laminated by press working. The rotor core of a conventional rotary electric machine is configured such that, in order to suppress axial runout due to the bend and deformation of the shaft in the case of press-fitting the shaft, the diameter of the center hole of the laminated rotor core is configured to be partially slightly increased in the axial direction to form a gap between the increased center hole and the shaft; and thus, a reduction in the press-fitting force of the shaft is achieved, the bend and deformation of the shaft are prevented, and the axial runout is solved (for example, see Patent Document 1).

PRIOR ART DOCUMENT

Patent Document

Patent Document 1: Japanese Unexamined Utility Model Publication No. 59-145248
Patent Document 2: Japanese Unexamined Patent Publication No. 2006-217770

SUMMARY OF THE INVENTION

Problems to be Solved by the Invention

In the case of a conventional rotary electric machine in which magnets are fixed to the outer circumferential surface of a rotor core by bonding, in the configuration of the conventional rotor core, a design is not made in consideration of a difference of the amount of deformation at a press-fitting portion and a non-press-fitting portion of the rotor core at the time of press-fitting of a shaft; and accordingly, there is a drawback that waviness is generated on the outer circumferential surface (flat surface) of the rotor core serving as a magnet bonding surface and thus the bonding strength of the magnets and magnet attachment accuracy are lowered. Furthermore, in the case of setting a press-fitting allowance to be small in order to suppress the waviness of the outer circumferential surface (flat surface) of the rotor core, rotating torque of the rotor core becomes small; and accordingly, it is difficult to achieve a balance between suppression of the waviness and securement of necessary rotating torque of the rotor core.

The present invention has been made to solve the above described problem, and an object of the present invention is to provide a highly accurate rotor for a rotary electric machine and a highly accurate motor for electric power steering, both of which can reduce the press-fitting force of a shaft while securing necessary rotating torque of a rotor core, and which combine not only measures in which deterioration of fluctuation of the rotor core due to an increase in the press-fitting force caused by galling (seizure or the like) is prevented, but also effects in which waviness of the outer circumferential surface (flat surface) of the rotor core to which magnets are attached is suppressed and the bonding strength of the magnets and the attachment accuracy of the magnets are improved.

Means for Solving the Problems

According to the present invention, there is provided a rotor for a rotary electric machine in which magnets are bonded to the bonding surface of the outer circumferential surface of a rotor core laminated by rotating a steel sheet. In the rotor for the rotary electric machine, the hole diameter of a shaft through hole formed in the rotor core laminated by rotating is changed in an axial direction, thereby forming a concave portion whose hole diameter is large and a convex portion whose hole diameter is small in the inner circumferential surface of the shaft through hole; the convex portion is arranged at opening portions on both ends of the shaft through hole; a shaft having ridge-shaped convex portions on a press-fitting portion is press-fitted into the shaft through hole to assemble; the number of points of the concave portion is equal to or more than two and the number of points of the convex portion is that of the concave portion plus one; and respective diameter dimensions of the concave portion, the convex portion, and the shaft are set to be the diameter of a main body of the shaft<the diameter of the convex portion<the diameter of the ridge-shaped convex portions of the shaft<the diameter of the concave portion.

Advantageous Effect of the Invention

According to the rotor for the rotary electric machine of the present invention, the rotor for the rotary electric machine can reduce press-fitting force while securing necessary rotating torque of the rotor core, and can combine not only measures in which deterioration of fluctuation of the rotor due to an increase in the press-fitting force caused by galling or the like is prevented, but also effects in which waviness of the outer circumferential surface of the rotor core to which the magnets are attached is suppressed and the bonding strength of the magnets and the attachment accuracy of the magnets are improved. Furthermore, the accuracy of a slant or the like of a single item of the rotor core can also be improved by being laminated by rotating.

Objects, features, aspects, and advantageous effects other than the foregoing of the present invention will become more apparent from the following detailed description of the present invention which refers to the accompanying drawings.

BRIEF DESCRIPTION OF THE DRAWINGS

FIG. 1A is a side sectional view, FIG. 1B is a sectional view taken along the line A-A of FIG. 1A, and FIG. 1C is an enlarged sectional view for explaining the thickness of a laminate sheet;

FIG. 2A is a side sectional view, and FIG. 2B is a sectional view taken along the line B-B of FIG. 2A; FIG. 3A is a side sectional view, and FIG. 3B is a sectional view taken along the line C-C of FIG. 3A.

MODE FOR CARRYING OUT THE INVENTION

Figure 1A:
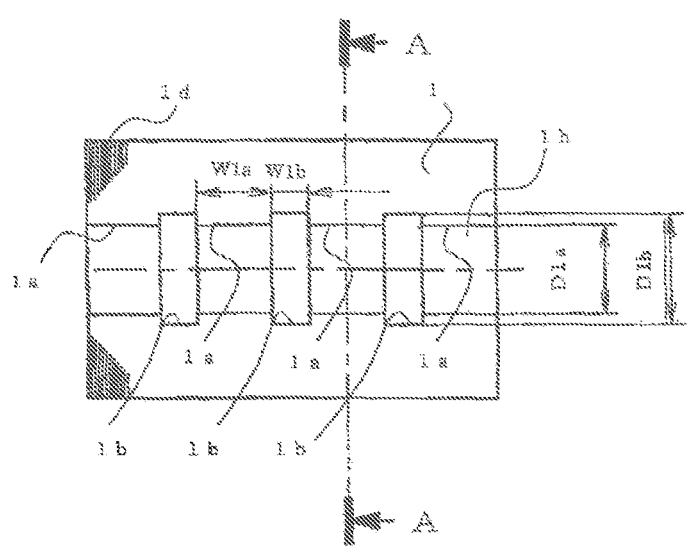
FIGS. 1A to 1C are explanation views each showing the basic configuration of a rotor core according to the present invention.

Hereinafter, respective embodiments of the present invention will be described with reference to drawings.

Incidentally, the same reference numerals as those shown in the respective drawings represent the same or corresponding elements.

Embodiment 1

Figure 1B:
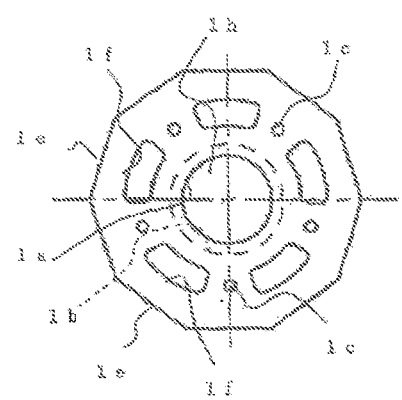

First, the basic configuration of a rotor core main body for a rotary electric machine according to the present invention will be described with reference to FIGS. 1A to 1C.

A rotor core 1 is formed by a plurality of sheets of magnetic material in which a steel sheet is formed in a predetermined shape by press punching and the punched steel sheet 1d is laminated by rotating, and the steel sheets are integrally fixed by a plurality of caulking portions 1c. A plurality of flat surface portions 1e which are for being bonded to a plurality of magnets 4 are provided on the outer circumference of the rotor core 1; a through hole 1h which is for being press-fitted by a shaft 2 is formed in the center of the rotor core 1; and the hole diameter of the through hole is changed in the axial direction of the rotor core 1 to form a convex portion 1a whose hole diameter is small at four points and a concave portion 1b whose hole diameter is large at three points.

As described above in Embodiment 1, the steel sheet 1d is laminated by rotating; and therefore, lamination thickness is averaged even when a deviation is generated in the thickness of the sheet depending on the position of the material, the accuracy of a slant or the like of the rotor core 1 can be improved, and a suppression effect also exists for waviness of the magnet bonding surfaces 1e. Furthermore, the through hole which is for being press-fitted by the shaft 2 is formed in the center portion of the rotor core 1; and the hole diameter of the through hole is changed in the axial direction of the rotor core 1, thereby forming the convex portions 1a and the concave portions 1b each having an optimum diameter capable of suppressing the waviness of the magnet bonding surfaces at the time of press-fitting of the shaft.

Furthermore, the rotor core 1 is configured by the laminate sheets 1d having two types of large and small hole diameters whose hole diameters of the through holes are different; a plurality of laminate sheets having the small hole diameter are laminated, thereby forming the radially protruded convex portion 1a at four points in the inner circumferential surface of the through hole 1h; and a plurality of laminate sheets having the large hole diameter are laminated, thereby forming the radially sunk concave portion 1b at three points in the inner circumferential surface of the through hole 1h. Then, the concave and convex portions 1a and 1b are axially alternately arranged in the through hole 1h and the convex portion 1a is arranged at each opening portion on both ends of the through hole 1h, and the shaft 1 is press-fitted in the direction of an arrow (see FIG. 2A) from any of the opening portions (the left side in the case of FIG. 1A) to assemble the rotor.

Figure 1C:
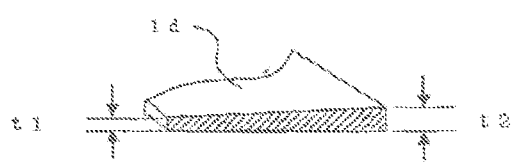

The sheet thickness of the material (laminate sheet 1d) is not constant (t1 and t2) as shown in FIG. 1C; and accordingly, the thickness is different depending on a position. Even when a slight deference exists in the case of one sheet of the material, the difference increases manyfold in the case where several sheets of the material are laminated; and the increased difference in thickness after lamination leads to the slant of the rotor core 1, which is not negligible. However, as described above in Embodiment 1, the laminate sheet 1d is laminated by rotating; and therefore, even when a deviation is generated in the sheet thickness depending on the position of the material, the lamination thickness is averaged, the accuracy of the slant or the like of the rotor core 1 can be improved, and a suppression effect exists also for the waviness of the flat surface portion 1e serving as the magnet bonding surface. Furthermore, the convex portion 1a and the concave portion 1b of the hole diameters of the through hole change the hole diameters in the axial direction of the rotor core; and thus, it is effective to suppress the waviness of the flat surface portion 1e serving as the magnet bonding surface at the time of press-fitting of the shaft.

Furthermore, as described above, the convex portion 1a serving as a press-fitting portion of the rotor core 1 is provided at four points and the concave portion 1b serving as a non-press-fitting portion is provided at three points; and thus, the convex portion 1a is located at the opening portions on both ends of the rotor core 1. In doing so, misalignment of the inner diameter of the rotor core and the shaft 2, 3 (to be described later) is corrected at the time of press-fitting; and therefore, there is an effect that force to be applied in the radial direction of an end portion of the rotor core can be small to suppress the waviness of the flat surface portion 1e serving as the magnet bonding surface. In addition, provision is made such that the number of points of the concave portion 1b is equal to or more than two and the number of points of the convex portion 1a is that of the concave portion plus one; and thus, the number of points of the concave and convex portions can be increased and the length W1b of the concave portion 1b can be shortened depending on the axial length of the rotor core 1, and the waviness of the flat surface portion 1e serving as the magnet bonding surface can be suppressed.

Furthermore, the rotor core 1 is arranged with the convex portions 1a and the concave portions 1b in a symmetric shape which is symmetry toward both opening portions centering on a central point of the axis of the through hole 1h in the through hole 1h; and therefore, orientation of the rotor core 1 is disappeared and the shaft 2, 3 can be press-fitted by a stable press-fitting force regardless of an insertion direction to improve workability of press-fitting of the shaft.

Furthermore, the laminate sheets 1d in which the convex portion 1a serving as the press-fitting portion is opened and the laminate sheets 1d in which the concave portion 1b serving as the non-press-fitting portion is opened, are integrally fixed by the plurality of caulking portions 1c as described above; and thus, even when a large clearance exists between the concave portion 1b serving as the non-press-fitting portion of the through hole 1h and the shaft 2, 3, the amount of misalignment of the laminate sheets 1d in which the concave portion 1b is opened are not misaligned by that clearance. Therefore, there is an effect that the amount of radial deformation of the rotor is suppressed and the waviness of the flat surface portion 1e serving as the magnet bonding surface can be reduced.

Next, the structure of the rotor according to Embodiment 1 will be described with reference to FIGS. 2A and 2B.

Figure 2A:
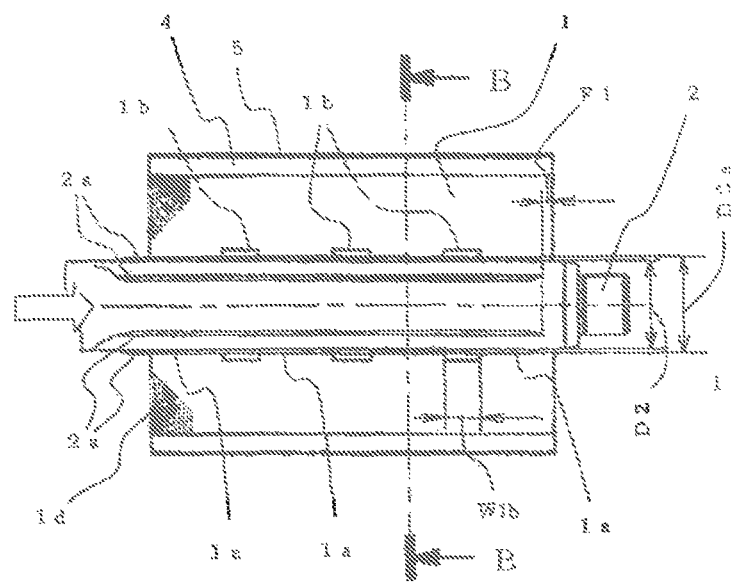
FIGS. 2A and 2B are views each showing a rotor for a rotary electric machine according to Embodiment 1 of the present invention.
Figure 2B:
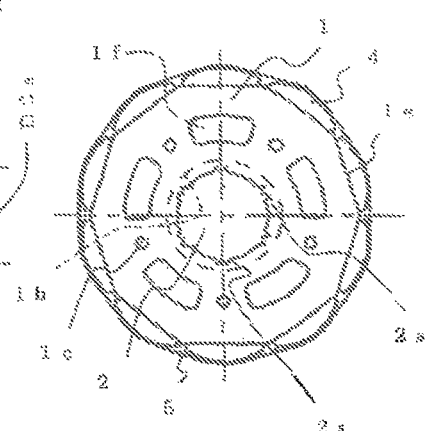

The rotor core 1 shown in FIGS. 2A and 2B is formed by laminate sheets made of magnetic material in which, for example, the laminate sheet 1d of a decagon is laminated by rotating by 72 degrees, and the through hole 1h is formed with the convex portion 1a serving as the press-fitting portion at four points and the concave portion 1b serving as the non-press-fitting portion at 3 points.

Further, the rotor core 1 includes: a shaft with ridges 2, which is formed with convex portions, that is, ridge portions 2a on the outer circumferential surface thereof and is to be press-fitted and held to the rotor core 1; a plurality of magnets 4 which are fixed by silicone adhesive to the outer circumferential surface (outer diameter surface) of the rotor core 1, that is, the flat surface portion 1e serving as the magnet bonding surface; and a protective cover 5 made of non-magnetic material which is provided on the outer circumference of the magnets. The rotor core 1 between the through hole 1h and the flat surface portion 1e serving as the magnet bonding surface is formed with hole portions 1f which pass through in the axial direction of the rotor core 1 to prevent the rotor core 1 from deforming (absorb deformation) at the time of press-fitting of the shaft 2; and thus, the waviness of the flat surface portion 1e serving as the magnet bonding surface is suppressed and a reduction in weight of the rotor is achieved. Incidentally, the arrow on the left side shown in FIG. 2A denotes the press-fitting direction of the shaft 2.

Furthermore, the diameters of respective constitutional components are set in a dimensional relationship of the diameter of a main body D2 of the shaft excluding the ridge-shaped convex portions<the diameter of the convex portion D1a of the rotor core<the diameter of the ridge-shaped convex portions D2a of the shaft<the diameter of the concave portion D1b of the rotor core.

As described above in Embodiment 1, the shaft 2 with the ridge-shaped convex portions is press-fitted into the rotor core 1 which is provided with the convex portions 1a serving as the press-fitting portion and the concave portions 1b serving as the non-press-fitting portion in the through hole 1h; and thus, necessary rotating torque is secured. Then, at the same time, the axial length W1a of the convex portion 1a and the points of the ridge-shaped convex portion of the shaft 2 are adjusted; and thus, the press-fitting force can be reduced.

When the axial length W1b of the concave portion 1b serving as the non-press-fitting portion exceeds 10 mm, the waviness of the flat surface portion 1e serving as the magnet bonding surface becomes large even in a state where the press-fitting force is low. However, the axial length W1b of the concave portion 1b is set to 0<W1b≤10 mm; and thus, the concave portion 1b of the rotor core 1 is suppressed from deflecting toward the inner side at the time of press-fitting of the shaft 2, and there is an effect that the waviness of the flat surface portion 1e on the outer circumferential surface of the rotor core 1 is suppressed.

Such a configuration can combine not only measures in which deterioration of fluctuation of the rotor core due to an increase in the press-fitting force caused by galling or the like is prevented, but also effects in which the waviness is suppressed from generating in the outer circumferential surface of the rotor core to which the magnets are attached, that is, the flat surface portion 1e serving as the magnet bonding surface and the bonding strength of the magnets and the attachment accuracy of the magnets are improved.

Furthermore, the convex portion 1a serving as the press-fitting portion and the concave portion 1b serving as the non-press-fitting portion are alternately arranged in the press-fitting direction of the rotor core 1; and thus, even if the galling is generated between the convex portion 1a of the rotor core 1 and the ridge-shaped convex portions of the shaft 2 at the time of press-fitting, stress increased due to the galling is released at the concave portion 1b serving as the non-press-fitting portion. Therefore, the galling is suppressed from continuously generating and there is an effect that the growth of the galling is suppressed. This not only provides measures in which deterioration of fluctuation due to an increase in the press-fitting force caused by the galling or the like is prevented, but also suppresses from generating deformation due to the galling, that is, the waviness on the flat surface portion 1e of the rotor core 1 to which the magnets 4 are attached and can improve the attachment accuracy of the magnets 4.

Furthermore, the silicone adhesive having elasticity is used for adhesive; and therefore, the waviness of the flat surface portion 1e is small, the thickness of the adhesive becomes thin in the case of good accuracy of flatness, and bonding force can also be secured. (Generally, if the thickness of the adhesive is thick, stress that agglutinates and breaks down becomes low and accordingly retention force lowers by just that much.)

In addition, the silicone adhesive has elasticity; and therefore, even when thermal stress is generated due to the difference between the linear expansion coefficients of the respective constitutional components of the rotor at low temperature and high temperature of use environment of the rotary electric machine, the thermal stress is reduced in the adhesive and bonding force can be secured without peeling off.

Besides, this Embodiment 1 is configured such that hardness of the rotor core 1 is lower than that of the shaft 2 and there is the difference between the hardnesses at the time of press-fitting; and therefore, it becomes possible to press-fit so that only the rotor core 1 is scraped and the waviness of the flat surface portion 1e serving as the magnet bonding surface can be suppressed by suppressing the galling of the shaft 2.

As shown in FIG. 2A, the configuration is made such that a dimension F1 between the end surface of the rotor core 1 and a leading end of the ridge portion 2a of the shaft 2 is set to have a relationship of F1>0 at a termination end portion in the press-fitting direction of the rotor core, that is, at a press-fitting start side end portion of the shaft 2 to be press-fitted into the through hole 1h, and the shaft 2 is fixed in the through hole 1h so that a leading end portion of the ridge portions 2a (ridge-shaped convex portions) of the shaft 2 does not protrude from the end surface of the rotor core to the outside from the opening of the through hole. Then, even when minute metal scrap is generated due to the galling of the rotor core 1 and the ridge portions 2a of the shaft at the time of press-fitting of the shaft, the ridge portions 2a do not protrude from the rotor core 1; and therefore, the structure is not mechanically-locked due to entering of the metal scrap between the rotor and a stator.

As shown in FIG. 2B, the rotor core 1 between the through hole 1h and the flat surface portion 1e serving as the magnet bonding surface is formed with the hole portions 1f which pass through in the axial direction of the rotor core 1 to prevent the rotor core 1 from deforming at the time of press-fitting of the shaft 2; and thus, even when the shaft 2 is press-fitted, deformation of the rotor core 1 is absorbed and the waviness of the flat surface portion 1e serving as the magnet bonding surface can be reduced. Furthermore, some portions of the rotor core 1 become hollow by the hole portions 1f; and thus, the weight of the rotor can be reduced.

Embodiment 2

Figure 3A:
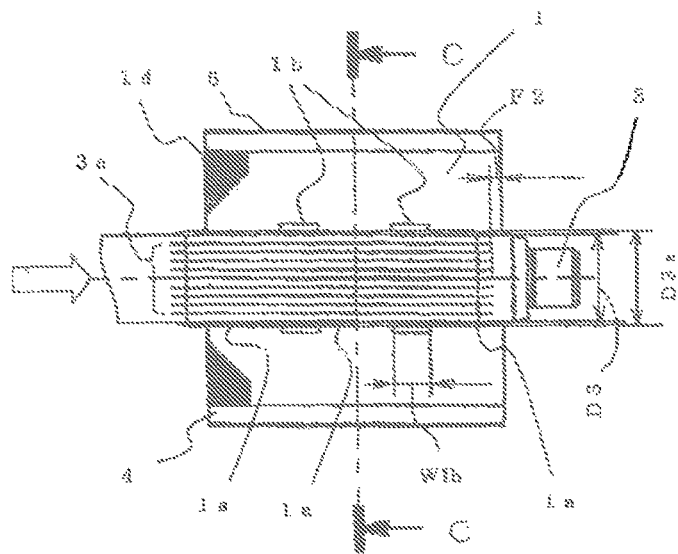
FIGS. 3A and 3B are views each showing a rotor for a rotary electric machine according to Embodiment 2 of the present invention.
Figure 3B:
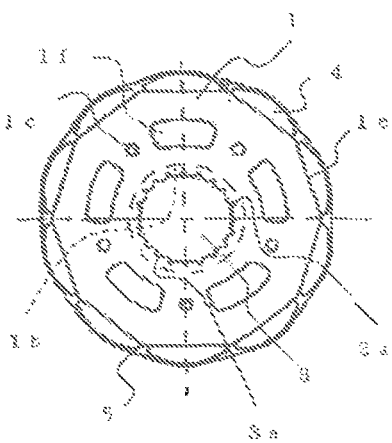

Next, the structure of a rotor according to Embodiment 2 will be described with reference to FIGS. 3A and 3B. Embodiment 2 shows a configuration in the case where the axial length of a rotor core 1 is shorter with respect to Embodiment 1 and constitutional components are the same as Embodiment 1. A different point is to be configured such that, in connection with the reduction in the axial length of the rotor core, a press-fitting portion of a shaft 3 uses a knurling shape as ridge-shaped convex portions, and hole portions 1f are formed between a through hole 1h and the outer circumferential surface of the rotor core 1. An arrow on the left side in FIG. 3A shows the press-fitting direction of the shaft 3.

Furthermore, the diameters of respective constitutional components are set in a dimensional relationship of the diameter of a main body D3 of the shaft excluding the diameter of knurling-shaped convex portions<the diameter of the convex portion D1a of the rotor core<the diameter of the knurling-shaped convex portions D3a of the shaft<the diameter of the concave portion D1b of the rotor core.

As described above in Embodiment 2, the shaft with knurling 3, which is formed with the convex portions, that is, knurling-shaped convex portions 3a on the outer circumferential surface, is press-fitted into the rotor core 1 which is provided with convex portions 1a each serving as a press-fitting portion and concave portions 1b each serving as a non-press-fitting portion in the through hole 1h; and thus, necessary rotating torque is secured. Then, at the same time, the axial length W1a of the convex portion 1a and the shape of the knurling-shaped convex portions 3a of the shaft 3 are adjusted; and thus, the press-fitting force can be reduced.

At this time, a press-fitting area is increased by forming the knurling shape on the shaft 3 by an amount which is short in the axial length of the rotor core 1; and thus, necessary rotating torque is secured.

As in Embodiment 1, the axial length W1b of the concave portion 1b serving as the non-press-fitting portion of the rotor core 1 is set to 0<W1b≤10 mm; and thus, the concave portion 1b of the rotor core 1 is suppressed from deflecting toward the inner side at the time of press-fitting of the shaft 3. Therefore, there is an effect that waviness of a flat surface portion 1e serving as a magnet bonding surface on the outer circumferential surface of the rotor core 1 is suppressed.

Furthermore, the convex portion 1a serving as the press-fitting portion and the concave portion 1b serving as the non-press-fitting portion are alternately arranged in the press-fitting direction of the rotor core 1; and thus, even if galling is generated between the convex portion 1a of the rotor core 1 and the knurling-shaped convex portions 3a of the shaft 3 at the time of press-fitting, stress increased by the galling is released at the concave portion 1b serving as the non-press-fitting portion. Therefore, the galling is suppressed from continuously generating and there is an effect that the growth of the galling is suppressed. This not only provides measures in which deterioration of fluctuation due to an increase in the press-fitting force caused by the galling or the like is prevented, but also suppresses from generating deformation due to the galling, that is, the waviness on the flat surface portion 1e serving as the bonding surface of the rotor core 1 to which the magnets 4 are attached and improves the attachment accuracy of the magnets 4.

Ordinarily, in connection with the reduction in the axial length of the rotor core, press-fitting length is also reduced; and therefore, rotating torque of the rotor core is also reduced. However, the shape of the press-fitting portion of the outer circumference of the shaft is formed in the knurling shape; and thus, a press-fitting area is increased more than Embodiment 1 and necessary rotating torque of the rotor core can be secured.

Besides, this Embodiment 2 is also configured such that hardness of the rotor core 1 is lower than that of the shaft 3 and there is the difference between the hardnesses at the time of press-fitting; and therefore, it becomes possible to press-fit so that only the rotor core 1 is scraped and the waviness of the flat surface portion 1e serving as the magnet bonding surface can be suppressed by suppressing the galling of the shaft 3.

As shown in FIG. 3A, the configuration is made such that a dimension F2 between the end surface of the rotor core 1 and a leading end of the knurling-shaped convex portions 3a of the shaft 3 is set to have a relationship of F2>0 at a termination end portion in the press-fitting direction of the rotor core, that is, at a press-fitting start side end portion of the shaft 3 to be press-fitted into the through hole 1h, and the shaft 3 is fixed in the through hole 1h so that a leading end portion of the knurling-shaped convex portions 3a of the shaft 3 does not protrude from the end surface of the rotor core to the outside from an opening of the through hole. Then, even when minute metal scrap is generated due to the galling of the rotor core 1 and the convex portions 3a of the shaft at the time of press-fitting of the shaft, the convex portions 3a do not protrude from the rotor core; and therefore, the structure is not mechanically-locked due to entering of the metal scrap between the rotor and a stator.

The description has been made on the rotor of the rotary electric machine in the above Embodiments 1 and 2; however, the present invention can also be applied to, for example, a motor for electric power steering. In the motor for electric power steering, the attachment positional accuracy of magnets influences on cogging torque and a torque ripple of the motor; and therefore, the waviness of the flat surface portion 1e serving as the magnet bonding surface is suppressed; and thus, there can be provided the motor for electric power steering in which a reduction in the cogging torque and the torque ripple is achieved and deterioration of steering feeling can be suppressed.

Incidentally, in the present invention, the respective embodiments can be combined and appropriately changed or omitted within the scope of the present invention.

The invention claimed is:

1. A rotor for a rotary electric machine in which magnets are bonded to a bonding surface of an outer circumferential surface of a rotor core,
    wherein the rotor core comprises a plurality of laminated steel sheets stacked in an axial direction of the rotor core, an axial thickness of each laminated sheet of the plurality of laminated sheets varies along a radial direction of each laminated sheet, the plurality of laminated steel sheets are rotated relative to one another about an axis of the rotor core such that differing thicknesses of respective laminated sheets are axially aligned so as to average the thicknesses of the laminated sheets in the axial direction of the of the rotor core;
    the hole diameter of a shaft through hole formed in said rotor core is changed in the axial direction, thereby forming a concave portion whose hole diameter is large and a convex portion whose hole diameter is small in the inner circumferential surface of the shaft through hole;

the convex portion is arranged at opening portions on both ends of the shaft through hole;

a shaft having ridge-shaped convex portions on a press-fitting portion is press-fitted into the shaft through hole;

a number of the concave portions is equal to or more than two and a number of the convex portions is that of the concave portion plus one; and respective diameter dimensions of the concave portion, the convex portion, and said shaft are set to be the diameter of a main body of said shaft<the diameter of the convex portion<the diameter of the ridge-shaped convex portions of said shaft<the diameter of the concave portion, wherein each of the convex portions comprises a plurality of said laminated steel sheets rotated relative to one another.

2. The rotor for the rotary electric machine according to claim 1,
wherein a structure is made such that an end portion of the ridge-shaped convex portions of said shaft does not protrude from the end surface of said rotor core at a press-fitting start side end portion of said shaft.

3. The rotor for the rotary electric machine according to claim 2,
wherein the concave portion and the convex portion are symmetrically arranged in the shaft through hole toward both of the opening portions centering on a central point of the axis of the shaft through hole.

4. The rotor for the rotary electric machine according to claim 2,
wherein the ridge-shaped convex portions of said shaft are formed in a knurling shape.

5. The rotor for the rotary electric machine according to claim 2,
wherein said rotor core is formed with a hole portion between the shaft through hole and the bonding surface of said magnets, the hole portion being formed for preventing said rotor core from deforming at the time of press-fitting of said shaft.

6. The rotor for the rotary electric machine according to claim 2,
wherein an axial length W1$b$ of the concave portion of said rotor core is set to 0<W1$b$≤10 mm.

7. The rotor for the rotary electric machine according to claim 2,
wherein hardness of said rotor core is lower than that of said shaft.

8. The rotor for the rotary electric machine according to claim 2,
wherein adhesive which fixes said magnets to said rotor core is silicone adhesive.

9. A motor for electric power steering which uses the rotor for the rotary electric machine as set forth in claim 2.

10. The rotor for the rotary electric machine according to claim 1,
wherein the ridge-shaped convex portions of said shaft are formed in a knurling shape.

11. The rotor for the rotary electric machine according to claim 1,
wherein said rotor core is formed with a hole portion between the shaft through hole and the bonding surface of said magnets, the hole portion being formed for preventing said rotor core from deforming at the time of press-fitting of said shaft.

12. The rotor for the rotary electric machine according to claim 11,
wherein hardness of said rotor core is lower than that of said shaft.

13. The rotor for the rotary electric machine according to claim 1,
wherein an axial length W1$b$ of the concave portion of said rotor core is set to 0<W1$b$≤10 mm.

14. The rotor for the rotary electric machine according to claim 1,
wherein hardness of said rotor core is lower than that of said shaft.

15. The rotor for the rotary electric machine according to claim 1,
wherein adhesive which fixes said magnets to said rotor core is silicone adhesive.

16. A motor for electric power steering which uses the rotor for the rotary electric machine as set forth in claim 1.

17. The rotor for the rotary electric machine according to claim 1,
wherein an axial length of the convex portion is greater than an axial length of the concave portion.

18. The rotor for the rotary electric machine according to claim 1,
wherein the convex portion comprises a plurality of convex portions, wherein an axial length of each convex portion is equal.

19. The rotor for the rotary electric machine according to claim 1,
wherein the concave portion comprises a plurality of concave portions, wherein an axial length of each concave portion is equal.

* * * * *